United States Patent [19]

Adachi et al.

[11] 4,411,516

[45] Oct. 25, 1983

[54] ORIGINAL ILLUMINATION APPARATUS

[75] Inventors: Hiroyuki Adachi, Tokyo; Shinnosuke Taniishi, Kawasaki, both of Japan

[73] Assignee: Canon Kabushiki Kaisha, Tokyo, Japan

[21] Appl. No.: 366,067

[22] Filed: Apr. 6, 1982

[30] Foreign Application Priority Data

Apr. 24, 1981 [JP] Japan .............................. 56-60319[U]
Apr. 24, 1981 [JP] Japan .............................. 56-60320[U]
Apr. 24, 1981 [JP] Japan .............................. 56-60321[U]

[51] Int. Cl.³ ...................... G03B 27/54; G03B 27/52
[52] U.S. Cl. ...................................... 355/67; 355/3 R; 355/30; 362/218; 362/294; 362/373
[58] Field of Search .................................. 355/67–71, 355/3 R, 30; 362/6, 218, 294, 345, 373, 3

[56] References Cited

U.S. PATENT DOCUMENTS

| | | | |
|---|---|---|---|
| 3,330,130 | 7/1967 | Schraith | 362/218 X |
| 3,330,180 | 7/1967 | Ferguson et al. | 362/294 X |
| 3,368,071 | 2/1968 | Bentzman | 362/218 |
| 3,541,492 | 11/1970 | Fenn | 362/294 X |

Primary Examiner—R. L. Moses
Attorney, Agent, or Firm—Fitzpatrick, Cella, Harper & Scinto

[57] ABSTRACT

The present invention relates to an original illuminating apparatus for use in electrophotographic copying machine, original reader of fascimile equipment, etc. The illumination apparatus includes a transparent member for defining a window through which the original is opposed to the optical system for projecting an image of the original on a photosensitive surface. The transparent member is fixed to and supported by a supporting part. The illumination light emitted from a light source is reflected towards the original so as to illuminate it by the reflected light. According to the present invention, the transparent member supporting part and the light reflecting part are formed integrally with a heat conductive member so that the two parts are thermally connected with each other. A heat pipe is provided to deprive the heat conductive member of heat thereby preventing a rise of temperature of the transparent member.

14 Claims, 4 Drawing Figures

U.S. Patent   Oct. 25, 1983   Sheet 2 of 3   4,411,516
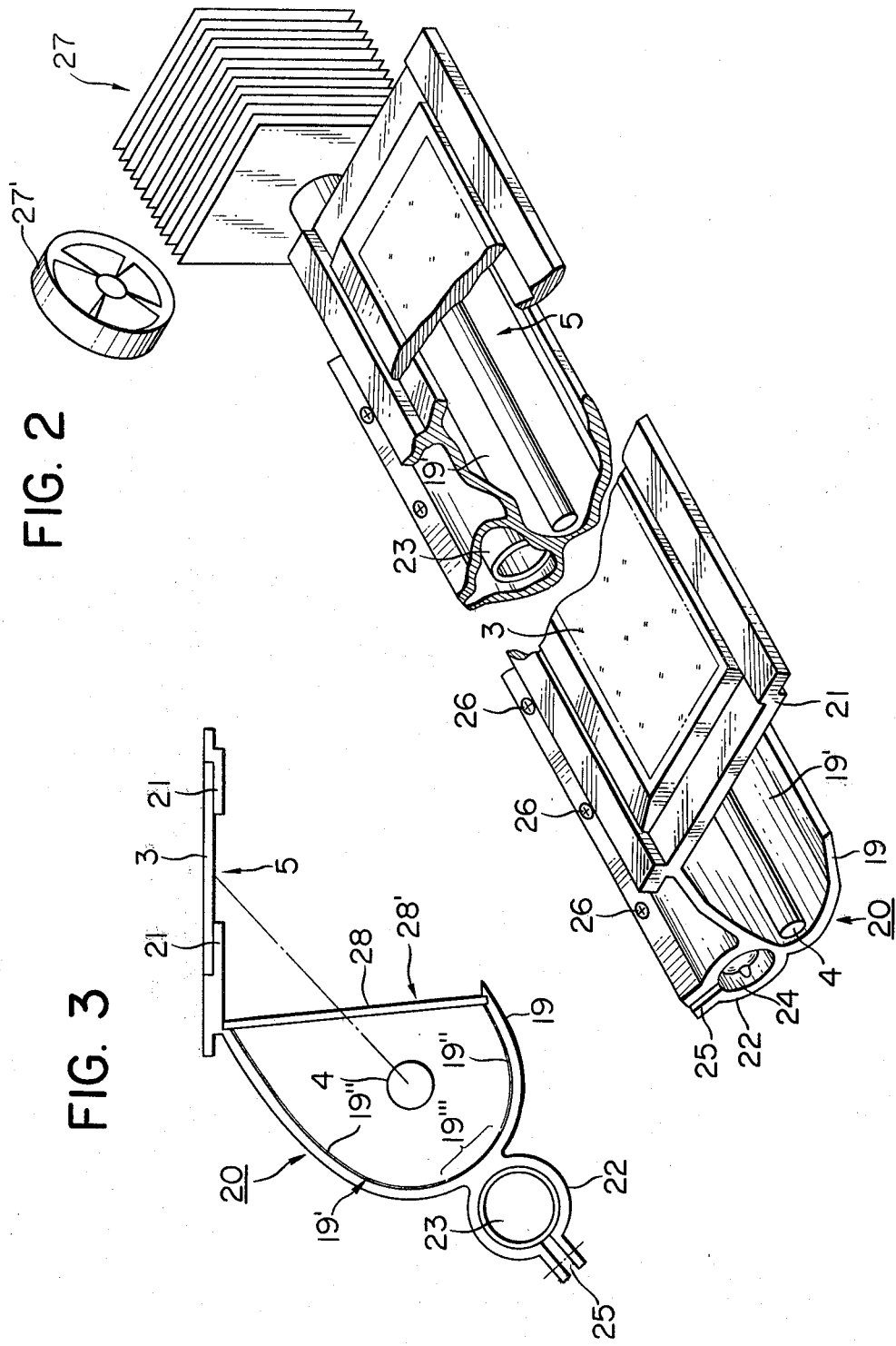

ORIGINAL ILLUMINATION APPARATUS

BACKGROUND OF THE INVENTION

1. Field of the Invention

The present invention relates to an original illuminating apparatus for use in electrophotographic copying machine, original reader of facsimile equipment and other image processing apparatus in which a desired image is formed from an original.

2. Description of the Prior Art

Conventional original illuminating apparatus have a common problem that the atmospheric temperature in the image processing apparatus and/or the temperature of platen glass are undesirably raised up by heat radiated from the light source. This problem is of critical importance in particular when a light emission filament, such as halogen lamp, is used as the original illumination light source in order to obtain a large quantity of light from the light source. For example, there is known a type of apparatus in which the platen glass is formed in the shape of a slit-like window and is fixed in a position whereas the original is moved across the glass platen for scanning the original which is illuminated by a lamp stationary relative to the glass platen. When a large number of originals are continuously fed into such an apparatus and the lamp continues to be on for a long time, then an abnormal temperature rise of the platen glass is caused by the radiation heat from the lamp. In such a case, the original is subjected to quality change. If the original is a thin sheet, it is dried up rapidly and its physical properties such as elasticity and smoothness are greatly changed so that the trouble of paper jamming may frequently be produced. Furthermore, if the operator unintentionally touches the heated platen glass, it may cause a burn in this hand.

To prevent the above troubles, in many of the conventional apparatus, the platen glass, lamp and reflector tube have been cooled by means of cooling air. However, it has various drawbacks. First, it is difficult to attain uniform cooling. Second, to obtain an adequate cooling effect, the apparatus is required to have a larger size.

Japanese Patent Application laid open No. Sho.55-95937 has disclosed such an apparatus in which the reflector for original illumination light is cooled not by cooling air but by means of a heat pipe. This apparatus has been proposed and is directed at reducing the temperature elevation of the atmosphere and therefore reducing also the temperature elevation of the platen glass by cooling the reflector. It is admitted that this apparatus has an effect to prevent the temperature elevation of the platen glass through the atmosphere. However, the temperature of the platen glass rises up not only through the atmosphere but also directly by thermal rays radiated together with visible light from the lamp. Therefore, even in the prior art apparatus, abnormal temperature rising of glass platen is caused by radiation heat when the apparatus operates continuously for a long time.

SUMMARY OF THE INVENTION

Accordingly, it is an object of the invention to provide an original illuminating apparatus which can prevent abnormal temperature elevation of the platen glass.

It is another object of the invention to provide an original illuminating apparatus which can prevent abnormal temperature elevation of the atmosphere as well as the platen glass.

It is a further object of the invention to provide an original illuminating apparatus which does not produce any problems in conveying the original even when the apparatus continues operating for a long time.

It is still a further object of the invention to provide an original illuminating apparatus which does not change the quality of the original even when the apparatus continues operating for a long time.

It is also an object of the invention to provide an original illuminating apparatus which never endangers the operator.

Other and further objects, features and advantages of the invention will appear more fully from the following description of preferred embodiments taken in connection with the accompanying drawings.

BRIEF DESCRIPTION OF THE DRAWINGS

FIG. 2 is a perspective view of the original illuminating apparatus according to the invention with a part of the apparatus being broken away to show the cross-section thereof;

FIG. 3 is a cross-sectional view showing another embodiment of the invention.

DESCRIPTION OF THE PREFERRED EMBODIMENTS

Figure 1:
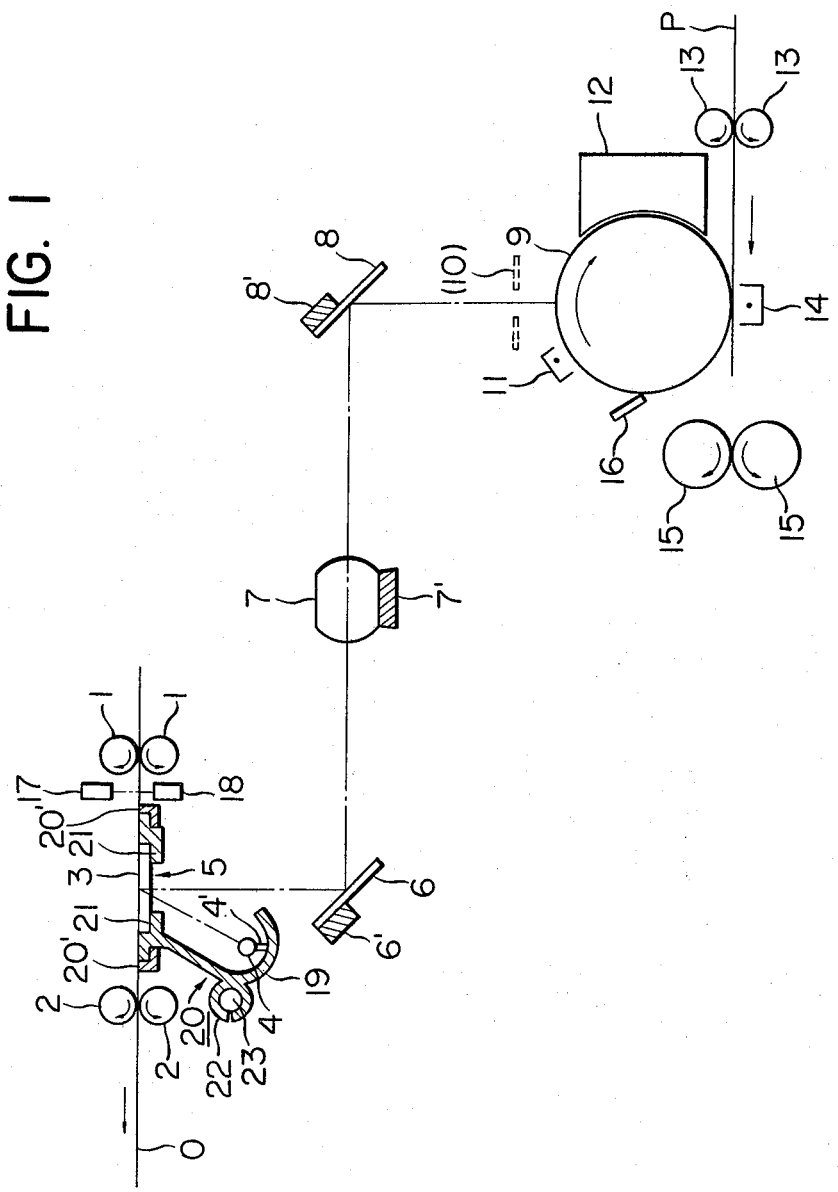
FIG. 1 is a schematic illustration of an electrophotographic copying apparatus in which the present invention is embodied.

Referring first to FIG. 1, an original O is slide on a platen 3 in the direction of arrow by a pair of feed rollers 1 and 2. The platen 3 is made of a material transparent to light such as glass and is in the form of a planar plate. The original O is in close contact with the upper surface of the platen. In order words, the platen 3 is an original positioning member. While being slide on the platen 3, the original O is illuminated by light emitted from a halogen lamp 4 through a slit opening 5 and the transparent platen 3. The reflected light from the original again passes through the platen 3 and the slit opening 5 and is directed to a stationary mirror 6. The stationary mirror 6 reflects the light to a stationary lens 7 which transmits the light to a stationary mirror 8. By this stationary mirror, the light is projected on a drum 9 having an electrophotographic photosensitive medium applied on the circumference of the drum.

As shown in FIG. 1, the stationary members 6, 7 and 8 are fixedly supported on stationary members (such as beams) 6', 7' and 8' respectively in the shown positions. These stationary members, mirrors 6 and 8 and lens 7 constitute an image forming optical system. The slit opening 5 defines an area on the platen 3. Through the defined area of the platen, the original O is opposed to the image forming optical system. Therefore, when the original O is moved across the platen 3, the original is scanned slitwise by the image forming optical system. At this time, an image of the slit opening 5 is also formed on the drum by the optical system although the image is somewhat out of focus. Consequently, the exposure area of original image on the drum 9 is limited to the area defined by the slit opening image. In this manner, the original image is exposed slitwise. To define the slit exposure area of the original image on the drum 9 there may also be used a slit plate 10 located in the vicinity of the drum 9. In this case, the opening 5 serves solely as means for limiting the original illumination area. It does not serve as means for defining the exposure area of original image to the drum 9. In this connection, it is to be noted that the longitudinal direction of the slit opening 5 and that of the slit opening formed in the slit plate 10 are perpendicular to the direction of original movement and to the direction of drum rotation, respectively. The upper surface of the platen 3 and the drum surface in the exposure position are optically conjugated relative to the lens 7. In other words, an in-focus image of the original placed on the upper surface of the platen 3 is formed on the exposure area of the drum circumferential surface by the image forming optical system.

Before the slitwise exposure of the original image, the drum 9 is uniformly charged by a corona discharger 11. Subsequent to the pre-charging step, the drum is slitwise exposed to the original image in the manner described above so as to form an electrostatic latent image on the drum. The latent image is then developed to a toner image by a developing device 12. This toner image is transferred onto a transfer sheet P under the action of a transfer charger 14. To feed the transfer sheet P there is provided a pair of feed rollers 13. The transferred toner image is conveyed to a fixing station where the toner image is fixed on the transfer sheet P by a pair of fixing rollers 15. On the other hand, after transferring, the drum 9 enters a cleaning station where the surface of the drum is cleaned up by a cleaner 16 to prepare it for the next cycle of the above image processing process.

In FIG. 1, 17 is a light emitting element such as light emitting diode or miniature electric bulb and 18 is a photo receptor element such as CdS or solar battery. The light emitting element 17 and the photo receptor element 18 constitute together an original detector. This original detector is disposed along the original moving path. (In the shown embodiment, the detector is located on the upstream side of the platen glass 3. But, it may be on the downstream side). When the forward edge of the moving original cuts off the light running from the element 17 toward the element 18, there is obtained a signal from the photo receptor element 18. By means of the signal, the driving of the transfer sheet feeding rollers 13 is controlled so as to register the forward edge of transfer sheet P with the forward edge of the formed original image (toner image) on the drum 9. To control the timing of feed of transfer sheet P in this manner there may be used any suitably known controlling means.

FIG. 2 shows an arrangement of the original illumination system used in the above described apparatus.

The illumination system comprises the above mentioned halogen lamp 4, platen glass 3 and a heat transmission member 20. The halogen lamp 4 extends in the direction perpendicular to the direction of the original being moved. The platen glass is elongated in the same direction as the halogen lamp. The heat transmission member 20 is an elongate member extending also in the same direction as the halogen lamp 4. The heat transmission member is made of a material of good thermal conductivity such as aluminum, copper or stainless steel and has a light reflecting part 19 and a platen supporting part 21. The above mentioned slit opening 5 is formed in the platen supporting part 21.

As seen in FIG. 1, the halogen lamp 4 is fixed to the heat transmission member 20 through an arm 4'. The heat transmission member 20 is in turn fixed to and supported by a stationary member 20' which may be a beam. The platen glass 3 is fixed to the platen supporting part 21 by means of, for example, bonding agent. Therefore, the platen glass 3, lamp 4 and heat transmission member 20 are all stationary in the shown positions in FIG. 2. The reflecting part 19 and the platen supporting part 21 are formed integrally with the heat transmission member 20 so that the two parts 19 and 21 are thermally connected to each other. Thus, heat is allowed to flow from one part to another through the heat conductive material of the member 20.

The reflecting part 19 is so shaped as to partly enclose the lamp 4. The reflecting surface 19' of the part 19 opposed to the lamp 4 reflects a major part of light rays emitted from the lamp 4 excepting the rays of light directly incident on the original O. The light reflected by the reflecting surface 19' is concentrated on the original O through the slit opening 5.

As well known to those skilled in the art, the halogen lamp 4 has merit in that a large quantity of light can be obtained from it. However, on the other hand, it has a drawback in that it generates high temperature heat. Due to the heat generated from the halogen lamp, the illumination system itself and also the device and equipment around it are heated up to an undesirably high temperature. Therefore, it is a problem to prevent such a temperature rise of these members caused by the heat from the halogen lamp 4. This problem becomes very important in particular for the shown type of copying apparatus in which the original illumination system is stationary and the original is moved for scanning. Since the original illumination system is stationary, the temperature of the platen glass 3 is raised by the heat from the halogen lamp to such an extent as to cause a critical problem. Further, if the temperature of photo sensor 18 is raised abnormally, then the sensor no longer operates correctly, which brings about the problem of incorrect timing of the feed of the transfer sheet P. The conventional method previously employed to solve the problem is air-cooling of the illumination system. To this end, in the prior art apparatus there has been provided an air blower or a suction fan to form a stream of cooling air. However, this cooling method has many drawbacks. The cooling air stream carries dust and foreign particles and forms a deposit of dust on the platen glass, which reduces the image quality. Also, such an air stream hinders the platen glass 3 and the original O from being in close contact with each other. This brings about the trouble of blurred image. In addition, uniform cooling is difficult to attain. Therefore, the opening forming part 21, platen glass 3 and reflecting mirror 19 are deformed due to the difference in thermal expansion. Of course, the quality of formed image is reduced by it.

These drawbacks involved in the prior art are overcome according to the present invention.

Designated by 22 in FIGS. 1 and 2 is a heat pipe supporting part integrally formed with the heat transmission member 20 on the side opposite to the lamp 4. Thus, the heat pipe supporting part 22, platen supporting part 21 and reflecting part 19 are three integral parts of the heat transmission member 20. As the heat pipe supporting part 22 is thermally connected to the platen supporting part 21 and reflecting part 19, heat is allowed to flow into the heat pipe supporting part 22 from the platen supporting part 21 and reflecting part 19 through the heat conductive material of the transmission member 20. The block of heat transmission member 20 having the reflecting part 19, platen supporting part 21 and heat pipe supporting part 22 can be made in a simple manner by extrusion molding or die casting of metal material such as aluminum.

Preferably, the heat pipe supporting part 22 has the same length as the reflecting part 19. The elongate heat pipe supporting part 22 has a hollow portion 24 and a cutout portion 25 contiguous to the hollow portion. A heat pipe known per se is inserted into the hollow portion 25. After inserting the heat pipe 23, the opposite walls of the cutout portion 25 are fastened to each other by means of screws 26 so that the heat pipe 23 is held in the hollow portion 24 with the outer surface of the heat pipe being in intimate contact with the inner wall surface of the hollow portion 24. The heat pipe 23 has a known inner structure, for example, channel type wick structure and contains therein a sealed working fluid, for example, water. At the end of the heat pipe 23 it has a radiation fin 27. Preferably a miniature fan 27' is provided to give cool air to the radiation fin 27 thereby increasing the efficiency of heat radiation.

Since, as previously noted, the heat pipe supporting part 22 is formed integrally with the reflecting part 19 and platen supporting part 21 on the heat transmission member 20, the heat in the parts 19 and 21 is easily transferred to the heat pipe supporting part 22 and the heat pipe 23 deprives the supporting part 22 of heat through the inner wall surface of the hollow portion 24. Therefore, the heat in the platen glass 3 heated by the halogen lamp 4 flows out into the heat pipe supporting part 22 through the platen supporting part 21 and then the heat is absorbed by the heat pipe 23. In this manner, the problem of abnormal temperature rising of the platen glass 3 is completely solved by the present invention. Also, uniform cooling of the platen glass 3 and the heat transmission member 20 is attained over all the length along the halogen lamp 4 because of the heat pipe 23 extending along nearly all of the length of reflecting part 19. The temperature around the illumination system is also kept at a level close to the atmospheric temperature.

FIG. 3 shows another embodiment of the heat transmission member according to the invention.

In this embodiment, the reflecting part 19 of the heat transmission member 20 is provided with a so-called hot mirror 28. The hot mirror 28 is composed of a transparent plate, such as glass plate, and a known optical interference film applied on the plate by vapour deposition. This interference film transmits visible light but reflects heat rays (infrared ray).

Like the above embodiment, the reflecting part 19 has an opening 28' through which the reflected light runs toward the original illumination area. However, in this embodiment, the opening 28' is closed by the hot mirror 28. Therefore, the original is illuminated by only visible light transmitted through the hot mirror 28. Infrared rays reflected by the hot mirror 28 heats the reflector part 19. The heat in the reflecting part 19 transfers to the heat pipe 23 uniformly over the whole length of the reflecting part because the heat pipe extends along nearly the whole length of the reflector part 19. The heat transferred to the heat pipe 23 is radiated from the radiation fin 27.

In this embodiment, the halogen lamp 4 is in the space closed air-tight by the hot mirror 28 and the reflector part 19. The hot mirror shuts out air flow to and from the space. Therefore, the air heated by the halogen lamp 4 can not come out of the space but remains confined therein. The heat of the confined air is absorbed into the heat pipe 23 through the reflector part 19. This embodiment is, therefore, very effective to prevent temperature rising of the atmosphere.

A further improvement of the cooling effect may be attained by applying a particular coating to the inner surface of the reflector part 19. In FIG. 3, reference character 19'' indicates such a coating applied to the reflection surface 19'' of the reflector part 19. The coating 19'' is a known interference reflection film having a particular optical characteristic of so-called cold mirror which transmits infrared ray but reflects visible ray of light. The interference reflection film coating 19'' may be applied by vapour deposition. With this structure of the reflecting part 19, the thermal ray component of the light emitted from the lamp 4 passes through the optical film 19'' and then it is effectively absorbed by the metal reflecting part 19. (The visible component of the emitted light is reflected by the optical film to illuminate the original). The heat absorbed into the reflector part 19 is transferred to the heat pipe 23 and then radiated from the radiation fin at the end of the heat pipe.

FIG. 3 also shows another means for further improvement of the cooling effect. It is indicated by 19''' in FIG. 3.

19''' is a black coating applied to a limited area of the inner reflecting surface 19' of the reflector part 19. The area where the black coating 19''' is to be applied is limited to such an area from which the lamp light reflected up the reflecting surface 19' can almost or not at all reach the original illumination area. Referring to FIG. 3, the area indicated by 19''' (assuming that it has no black coating) will reflect the light emitted from the lamp 4. But, all or nearly all of the light reflected upon the area will be cut off by the lamp 4 and only a very small portion of the reflected light will be allowed to reach the original illumination area. The black coating 19''' is applied to such an area only. The black coated surface portion 19''' absorbs the thermal rays very well and the heat is transferred into the heat pipe 23 through the wall of the reflector part 19. In this case, it is preferred that the heat pipe supporting part 22 be positioned near the black coated area 19''' as much as possible. In a preferred embodiment shown in FIG. 3, the heat pipe supporting part 22 is located directly behind the black coated area 19'''. The color of the coating 19''' applied to the particularly selected area is never limited to black only. Other colors which easily absorb infrared rays may be also used for this purpose. This modification may also be applied to the reflecting surface to which the above mentioned optical film having a cold mirror characteristic has been applied by vapor deposition. Also, it is to be understood that above described modification with the application of cold mirror coating 19'' or black coating 19''' on the reflecting part 19 is applicable also to the illumination system without any hot mirror 28.

Figure 4:
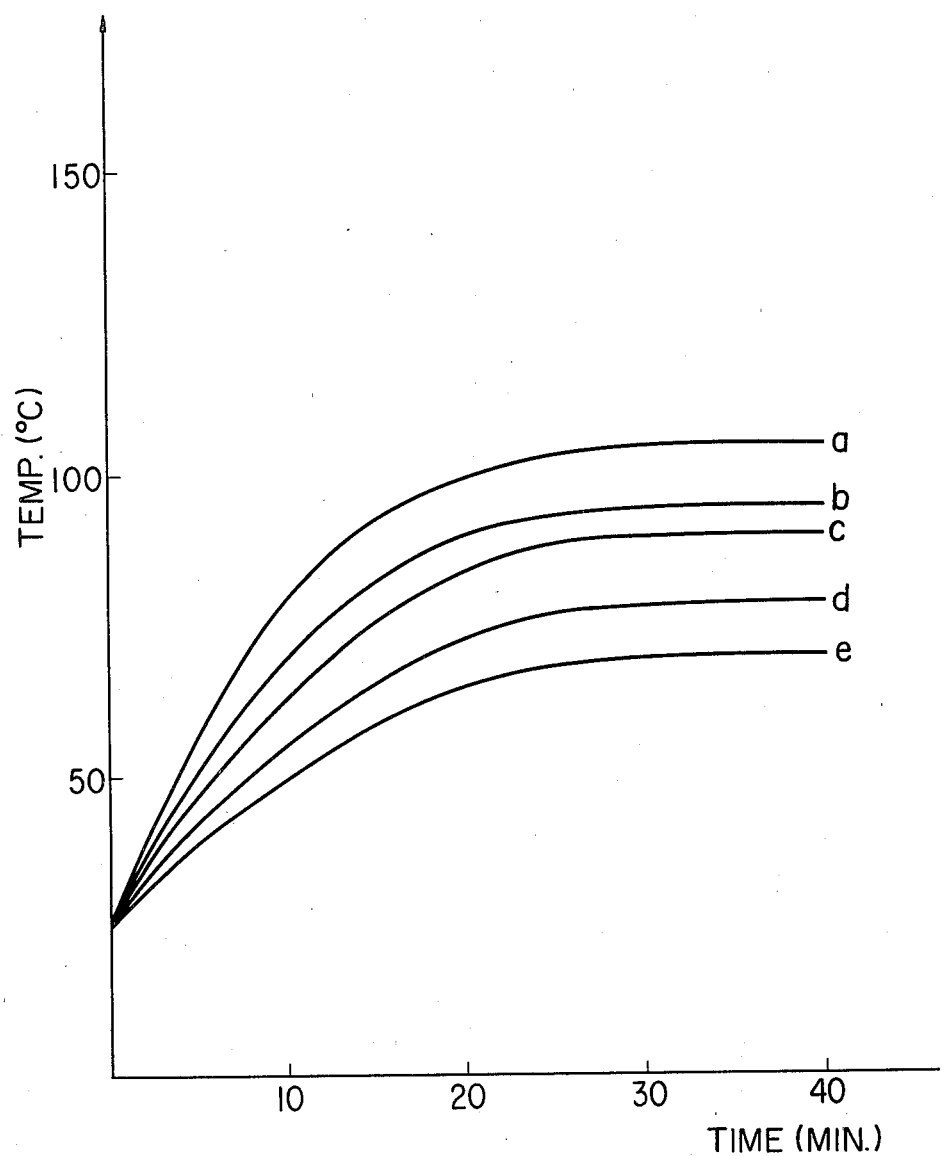
FIG. 4 is a graph showing the results of experiments on various embodiments of the invention.

FIG. 4 is a graph showing the results of experiments conducted on the various embodiments of the invention described above. In FIG. 4, temperature (°C.) is plotted on the ordinate and lighting time of the lamp (minute) on the abscissa. Curves a, b, c, d and e show changes of temperature of the platen glass for different embodiments. Of these five curves the curve a was obtained when only the heat pipe 23 was used. The second curve b was obtained when the heat pipe 23 was used and the cold mirror film 19'' was applied to the reflecting surface 19', and the third curve c was obtained when the black coating 19''' was additionally applied. The fourth curve d is that obtained when the heat pipe 23 was used and the hot mirror 28 was provided, and the fifth curve e was obtained when the cold mirror film 19'' was additionally applied.

The lamp 4 used in the these experiments was a halogen lamp of 80 V–35 W which was lighted on at 80 V. The heat pipe 23 was a copper heat pipe of 16 mm in diameter which had an inner structure of channel type wick. As the working fluid there was used water. The radiation fin 27 was composed of eighteen aluminum plates each being 0.5 mm in thickness, 105 mm in length and 95 mm in width. These aluminum plates were press-fitted on the end portion of the heat pipe over the area of 100 mm long. To accelerate the heat radiation a weak wind of 2 m/sec was given to the radiation fin 27. The heat transmission member 20 was formed by extrusion molding of aluminum.

While the present invention has been particularly shown and described with reference to preferred embodiments in connection with an electrophotographic copying machine, obviously many modifications and variations of the present invention are possible in the light of the above teachings. For example, the present invention may be applied also to an image forming apparatus in which instead of the electrophotographic photosensitive medium there is used an array of solid image pick-up elements such as a CCD arranged on the original image forming surface and a desired image is formed by means of the electric output signals from the elements corresponding to the intensity of the incident light.

Also, the platen supporting part 21 and the reflecting part 19 may be formed as two separate members which are afterwards assembled into a unit by means of bolt or other fastening means. Similarly, the reflecting part 19 and the heat pipe supporting part 22 may be formed as separate members which are also intimately joined together into a unitary body afterwards by means of bolt or other fastening means. However, it is to be noted that the most preferred form of the heat transmission member is one piece molding having the reflecting part, platen supporting part and heat pipe supporting part as integral parts formed, for example, by extrusion molding.

What we claim is:

1. Apparatus for illuminating an original whose optical image is to be formed on a photosensitive surface through an image forming optical system, said original illumination apparatus, comprising:
    a transparent member through which the original is opposed to said image forming optical system;
    light source means for emitting light to illuminate the original, said light source means being fixed relative to said transparent member;
    heat transmission means having, as its integral parts, a transparent supporting part for fixedly supporting said transparent member and a light reflecting part for reflecting a portion of the emitted light from said light source means so as to illuminate the original by the reflected light; and
    heat pipe means for depriving said heat transmission means of heat thereby cooling it.

2. Apparatus as set forth in claim 1, wherein said heat transmission means is a single block formed of a heat conductive material and includes said transparent supporting part and light reflecting part.

3. Apparatus as set forth in claim 1 wherein said heat transmission means further comprises a heat radiation part formed integrally with said transparent supporting part and light reflecting part, wherein said heat pipe means is fixed to said radiation part.

4. Apparatus as set forth in claim 3, wherein said heat transmission means is a single block formed of a heat conductive material and comprises said transparent supporting part, light reflecting part and radiation part.

5. Apparatus for illuminating an original whose optical image is to be formed on a photosensitive surface through an image forming optical system, said original illumination apparatus, comprising:
    a transparent member through which the original is opposed to said image forming optical system;
    original conveying means for moving the original across said transparent member for scanning the original;
    light source means for emitting light to illuminate the original, said light source means being fixed relative to said transparent member;
    heat transmission means having, as its integral parts, a transparent supporting part for fixedly supporting said transparent member and a light reflecting part for reflecting a part of the emitted light from said light source means to illuminate the original by the reflected light; and
    heat pipe means for depriving said heat transmission means of heat thereby cooling it.

6. Apparatus as set forth in claim 5, wherein said heat transmission means is a single block formed of a heat conductive material and comprises said transparent supporting part and light reflecting part.

7. Apparatus as set forth in claim 5, wherein said heat transmission means further comprises a heat radiation part formed integrally with said transparent supporting part and light reflecting part, wherein said heat pipe means is fixed to said radiation part.

8. Apparatus as set forth in claim 7, wherein said heat transmission means is a single block formed of a heat conductive material and comprises said transparent supporting part, light reflecting part and radiation part.

9. Apparatus as set forth in any one of claims 5 to 8, which further comprises original detection means disposed at a position close to said transparent member.

10. Apparatus as set forth in any one of claims 1 to 8, which further comprises a thermal ray cut-off member disposed in the optical path of the illumination light between said light source means and said transparent member so that said thermal cut-off member and the light reflecting part of said heat transmission means cooperate to form a chamber for receiving said light source means therein, said thermal ray cut-off member being able to transmit visible light.

11. Apparatus as set forth in claim 10, wherein said thermal ray cut-off member is a hot mirror.

12. Apparatus as set forth in any one of claims 1 to 8, wherein the surface of the light reflecting part of said heat transmission means includes a thermal ray absorbing surface.

13. Apparatus as set forth in claim 12, wherein said thermal ray absorbing surface is a black coated surface.

14. Apparatus as set forth in claim 12, wherein said thermal ray absorbing surface is a cold mirror surface.

* * * * *